US009210561B2

(12) United States Patent
Buck

(10) Patent No.: US 9,210,561 B2
(45) Date of Patent: Dec. 8, 2015

(54) METHOD AND SYSTEM FOR MANAGING AN EMERGENCY FOR ENHANCED USER SECURITY USING A MOBILE COMMUNICATION DEVICE

(71) Applicant: Lookout, Inc., San Francisco, CA (US)

(72) Inventor: Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 307 days.

(21) Appl. No.: 13/688,003

(22) Filed: Nov. 28, 2012

(65) Prior Publication Data

US 2014/0148120 A1 May 29, 2014

(51) Int. Cl.
H04M 11/04 (2006.01)
H04W 4/22 (2009.01)
H04W 12/06 (2009.01)

(52) U.S. Cl.
CPC ............... *H04W 4/22* (2013.01); *H04W 12/06* (2013.01)

(58) Field of Classification Search
CPC ..... H04W 4/22; H04W 4/001; H04W 76/007; G06F 17/30244; G06K 9/00288; H04M 1/0202; H04M 20/40
USPC .............. 455/404.1, 404.2, 550.1, 456.1, 450
See application file for complete search history.

(56) References Cited

U.S. PATENT DOCUMENTS

| 7,321,781 | B2 * | 1/2008 | Sorotzkin ................. 455/550.1 |
| 8,099,472 | B2 | 1/2012 | Mahaffey et al. |
| 8,204,760 | B2 * | 6/2012 | Cervi et al. ........................ 705/2 |
| 8,229,392 | B2 | 7/2012 | Bumiller et al. |
| 8,275,345 | B2 | 9/2012 | Bumiller et al. |
| 8,521,122 | B2 * | 8/2013 | Scott et al. ................. 455/404.1 |
| 8,543,081 | B2 * | 9/2013 | Scott et al. ................. 455/404.1 |
| 8,626,112 | B2 * | 1/2014 | Ray et al. .................... 455/404.1 |
| 2004/0024706 | A1 | 2/2004 | Leduc |
| 2004/0203622 | A1 | 10/2004 | Esque et al. |
| 2006/0079269 | A1 * | 4/2006 | Sorotzkin ................. 455/550.1 |
| 2008/0263477 | A1 * | 10/2008 | Ying et al. ..................... 715/810 |
| 2009/0197565 | A1 * | 8/2009 | Ogram et al. .............. 455/404.1 |
| 2009/0205041 | A1 | 8/2009 | Michalske |
| 2010/0190468 | A1 * | 7/2010 | Scott et al. ................. 455/404.2 |
| 2011/0143705 | A1 * | 6/2011 | Ogram et al. .............. 455/404.1 |

(Continued)

OTHER PUBLICATIONS

Wikipedia, "In case of emergency", available at http://en.wikipedia.org/wiki/In_case_of emergency, retrieved on Feb. 28, 2013, published on Dec. 15, 2005.

(Continued)

*Primary Examiner* — Joseph Arevalo
(74) *Attorney, Agent, or Firm* — Dergosits & Noah LLP

(57) ABSTRACT

Security is enhanced for a user of a mobile communications device by providing a method for managing an emergency event includes detecting, by a mobile communication device having a GUI for displaying information to a user, an indication that an emergency event is occurring. Once the emergency event is detected, a plurality of event options is displayed on the GUI to a responding user who is not an owner of the mobile communication device. Each event option is associated with at least one instruction relating to an emergency action and/or response. When an indication selecting a first event option is received, the mobile communication device executes the instruction(s) associated with the first event option.

41 Claims, 7 Drawing Sheets

(56) References Cited

U.S. PATENT DOCUMENTS

2014/0108048 A1* 4/2014 Cohn .............................. 705/3
2014/0199966 A1 7/2014 Schushan

OTHER PUBLICATIONS

Wikipedia, "E.123", available at http://en.wikipedia.org/wiki/E.123, retrieved on Feb. 28, 2013, published on Nov. 12, 2009.

Schneider, Laura, "Save Your Life: Wear a Medical Alert ID Bracelet (Medic Alert Symbol) and Carry an Information Card—Free Template", available at http://lauraschneider.hubpages.com/hub/Save-Your-Life-Wear-a-Medical-Alert-ID-Bracelet-if-You-Have-a-Serious-Medical-Condition-or-Are-On-Medication>, retrieved on Feb. 28, 2013, published on May 2, 2012.

The EMT Spot, "Advanced Medical History Bracelets and Methods", available at http://theemtspot.com/2012/07/15/advanced-medical-history-bracelets-and-methods/, retrieved on Feb. 28, 2013, published on Jul. 15, 2012.

\* cited by examiner

METHOD AND SYSTEM FOR MANAGING AN EMERGENCY FOR ENHANCED USER SECURITY USING A MOBILE COMMUNICATION DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments relate generally to mobile communication devices and more specifically to systems and methods for managing an emergency event by a mobile communication device for enhanced user security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Emergency events can occur and when they do, information that can help a person in need is often unavailable. For example, in a medical emergency, a bystander or a first responder may want to assist an injured or sick person. Having access to the injured person's medical information can be critical and the difference between saving and harming the person. In some cases, the injured person can be wearing a medical bracelet or a pendant. Those devices, however, provide only a minimal amount of medical information and, in the case of the pendant, are useless when out of range of a transceiver.

In another example, the emergency situation can be that a person has lost his or her mobile phone or tablet. When a stranger finds the device and wants to return it to its owner, he or she cannot because the stranger does not know how to contact the owner or where to return the device. In many cases, information identifying the owner and/or the owner's friends is stored in the device, and can be accessed if the device is not locked. Nevertheless, because the owner typically locks his or her device to protect his or her privacy, that information cannot be accessed by the device finder.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
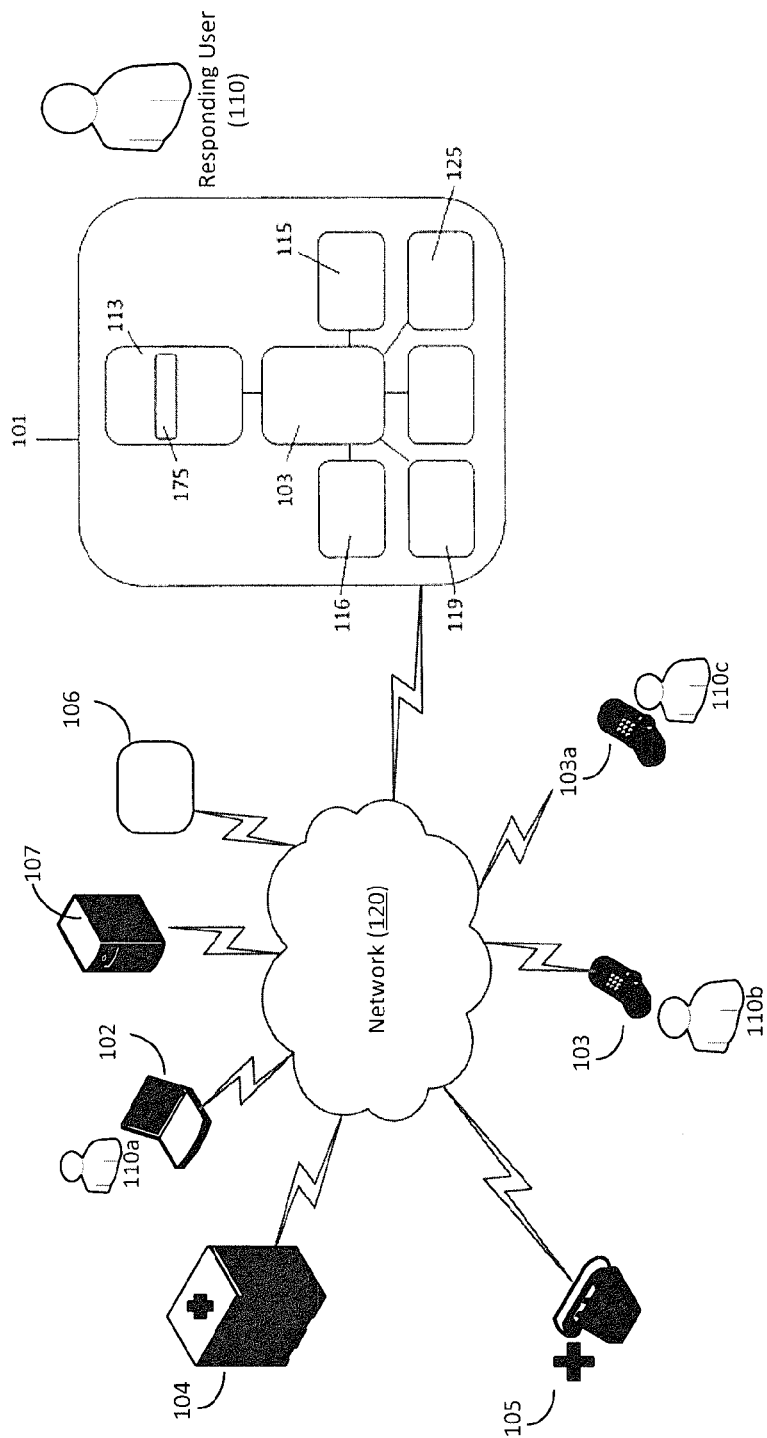
FIG. 1 is a block diagram illustrating an exemplary system for managing an emergency event by a mobile communication device according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for managing an emergency event by a mobile communication device. Mobile communication devices have evolved beyond simple telephone functionality and are now highly complex multifunctional devices with capabilities rivaling those of desktop or laptop computers. In addition to voice communications, many mobile communication devices are capable of text messaging, e-mail communications, internet access, and the ability to run full-featured application software. Mobile communication devices can use these capabilities to perform online transactions such as banking, stock trading, payments, and other financial activities. Furthermore, mobile communication devices used by an individual, a business, or a government agency often store confidential or private information in forms such as electronic documents, text messages, access codes, passwords, account numbers, e-mail addresses, personal communications, phone numbers, and financial information.

A key feature of such devices is that they are small and relatively lightweight. Thus, people typically carry these devices throughout the day, such as to work, meetings, appointments, restaurants, coffee shops, bars, and so forth. Accordingly, in case of an emergency involving the owner of such a device, the device can be used to provide emergency instructions and information to people other than the owner when the owner is either incapacitated or otherwise unavailable. According to an embodiment, when an indication that an emergency event is occurring is detected by the mobile communication device, a plurality of event options can be displayed on a graphical user interface ("GUI") of the device to a user who is not the owner of the device. In an embodiment, each of the event options can be associated with at least one instruction relating to emergency actions and/or emergency responses. When an event option is selected by the user, the device executes the instruction(s) associated with the selected event option.

According to an embodiment, for example, when the owner of the device has lost the device, the emergency event detected can be that the device has been found by a user who is not the owner. In this case, the event options displayed can be related to reporting the lost device and/or to turning in the lost device. When an event option relating to reporting the lost device is selected, the device can execute the associated instructions that, for example, automatically and autonomously establish a connection with a reporting entity. Alternatively, when an event option relating to turning in the lost device is selected, the device can execute the associated instructions that, for example, provide directions to and/or information about a location where the user can drop-off the lost device.

In another exemplary embodiment, a mobile communication device can be configured to provide access to medical information of the device's owner, and the emergency event detected can be a medical emergency relating to the owner. In this case, the event options displayed can be related to providing access to the device owner's medical information and/or to providing medical care information. When an event option relating to the device owner's medical information is selected, the device can execute the associated instructions that, for example, transmit the medical information to an authorized medical care provider. Alternatively, when an event option relating to medical care is selected, the device can execute the associated instructions that, for example, provide step-by-step instructions for applying basic medical treatment.

In addition to managing the emergency event, the device maintains the confidentiality of the owner's personal and sensitive information stored in the device. Moreover, the device can remain in a locked state for all purposes except for the purpose of managing the emergency event. Accordingly, the mobile communication device cannot be used to provide any other function besides those provided by the event options, and is therefore of limited use to the person who has found the lost device, or the person who is helping the owner in a medical emergency.

As used herein, the term "mobile communication device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. The term "mobile communication device" excludes other laptop computers, notebook computers, or sub-notebook computers that do not run an operating system that is also used on mobile phones, PDAs, and smartphones. Specifically, mobile communication devices include devices for which wireless communication services such as voice, messaging, data, or other wireless Internet capabilities are a primary function. As used herein, a "mobile communication device" may also be referred to as a "device," "mobile device," "mobile client," or "handset." However, a person having skill in the art will appreciate that while the present invention is disclosed herein as being used on mobile communication devices, the present invention may also be used on other computing platforms, including desktop, laptop, notebook, netbook, or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by a server can be utilized by a user. Client computers may be able to display a web page, load an application, load a widget, or perform other display functionality that allows the client computer to report information from the server to the user and to receive input from the user in order to send requests to the server.

Prior to describing the subject matter in detail, an exemplary mobile communication device in which the subject matter may be implemented shall first be described. Those of ordinary skill in the art will appreciate that the elements illustrated in FIG. 1 may vary depending on the system implementation. With reference to FIG. 1, a block diagram of an embodiment of the mobile communication device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: Bluetooth, local area networks such as WiFi, and cellular networks such as GSM or CDMA.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 may operate in a networked environment using logical connections to one or more remote nodes 102-107 via a communication interface. The remote node may be another computer, a server, a router, a peer device or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

For example, the mobile device 101 can be connected to an audio data transport provider 106 that can be responsible for call routing or call handling at the direction of the mobile device 101. The audio data transport provider 106 may be a Voice over Internet Protocol (VoIP) provider or a cellular provider. In an embodiment, the audio data transport provider 106 provides the transport of audio or audio transmission between the mobile device 101 and one or more of remote nodes 102-105, 107 such as over a circuit or packet switched interface. Aspects of the system may be implemented via a VPN using IP-based or non-IP-based protocols (e.g. IPX, NetBIOS) to send voice samples.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
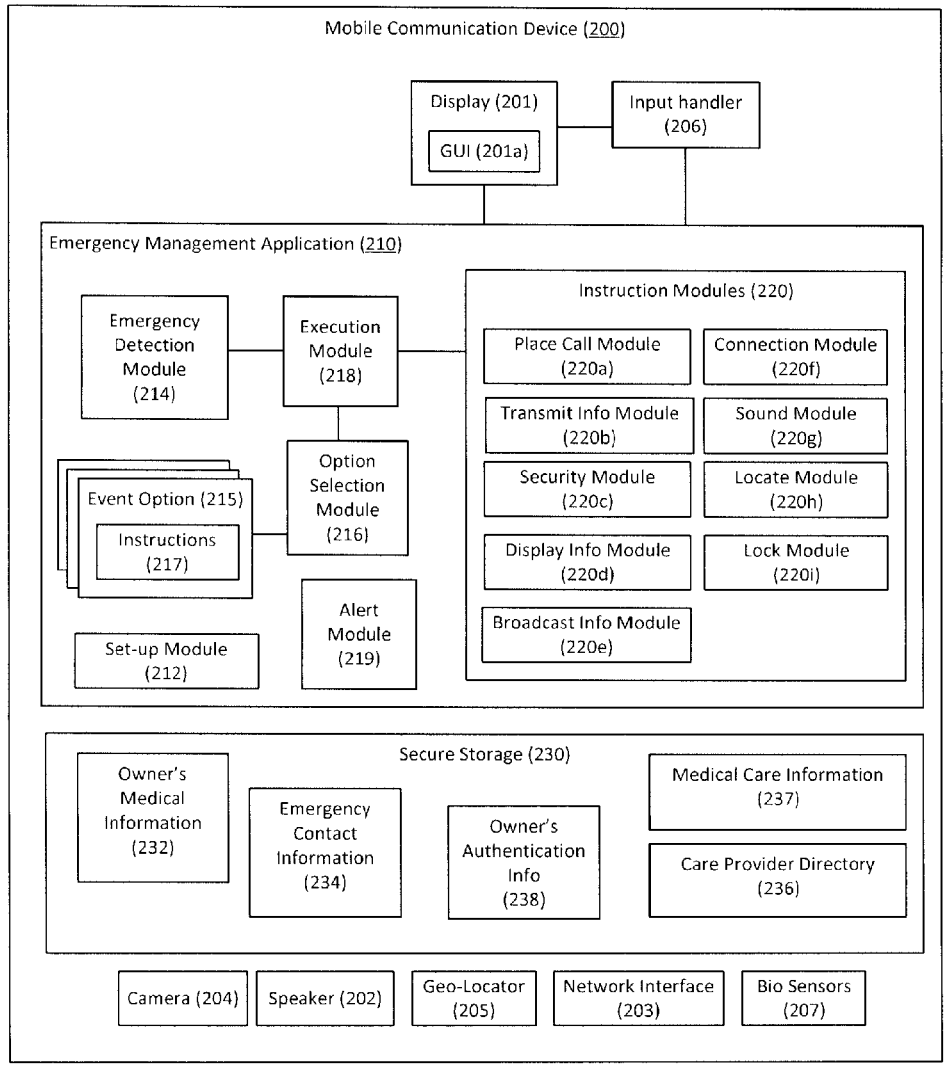
FIG. 2 a block diagram illustrating an exemplary mobile communication device according to an embodiment.

FIG. 2 is a more detailed block diagram of an exemplary mobile communication device 200 having components, and/or their analogs, that are configured to manage an emergency event according to an embodiment. As is shown in FIG. 2, the mobile communication device 200 can include a display 201, a processor, secure storage 230, memory, a speaker 202, a microphone, a network interface 203, a jack, a camera 204, an antenna, an accelerometer, a geo-locator sensor 205, e.g., a Global Positioning System (GPS), a bio sensor 207 and other sensors.

According to an embodiment, the mobile communication device 200 be configured to provide an execution environment configured to support operation of an Emergency Management Application 210. The Emergency Management Application 210 can include a set-up module 212 configured to receive the device owner's emergency data, including, for example, the device owner's medical information 232, emergency contact information 234, a care provider directory 236, medical care information 237, the owner's authentication information 238 and/or other emergency data. The set-up module 212 can also be configured, in an embodiment, to store the emergency data in the secure storage 230 of the mobile communication device 200.

The Emergency Management Application 210 can also include, in an embodiment, an emergency detection module 214, a plurality of event options 215, an option selection module 216, and an execution module 218. The emergency detection module 214 can be configured to receive an indication that an emergency event is occurring. In an embodiment, the option selection module 216 can be configured to receive an indication selecting an event option 215. In an embodiment, each of the plurality of event options 215 is associated with at least one instruction 217 relating to an emergency action and/or an emergency response. The execution module 218 can be configured to execute the at least one instruction 217 associated with the selected event option 215.

In an embodiment, the Emergency Management Application 210 can include at least one instruction module 220, which when invoked, is configured to perform at least one instruction associated with an event option 215. For example, the instruction modules 220 can include, in an embodiment, a place call module 220a for initiating an audio transmission, and a transmit information module 220b for receiving and transmitting data to a remote node over the network 230. The instruction modules 220 can also include a security module 220c that can cause the communication device 200 to take pictures, record video, record sound, collect location data indicating a position of the device 200, collect device state data, e.g., battery data, whether or not the device is locked, collect device usage data, e.g., calls placed by the device, calls received by the device, websites visited, or applications installed, collect physical information associated with the device such as device orientation, capture screenshots or screen recording, e.g., capture an image or record the visible items being displayed on a display screen 201 of the device, collect other information available on the device, and/or combinations of these.

In addition, the instruction modules 220 can include a display information module 220d for rendering and displaying information on a graphical user interface ("GUI") 201a of the display 201, a broadcast information module 220e for broadcasting information over a dedicated communication channel, e.g., an emergency response channel, and a connection module 220f for establishing a connection, e.g., over the network 120, with a remote node. In an embodiment, instruction modules 220 can also include a sound module 220g for providing audio information to the device's speaker 202, a locate module 220h for determining a location of another device or destination, and a lock module 220i for disabling certain functions and services of the device 200.

Figure 3:
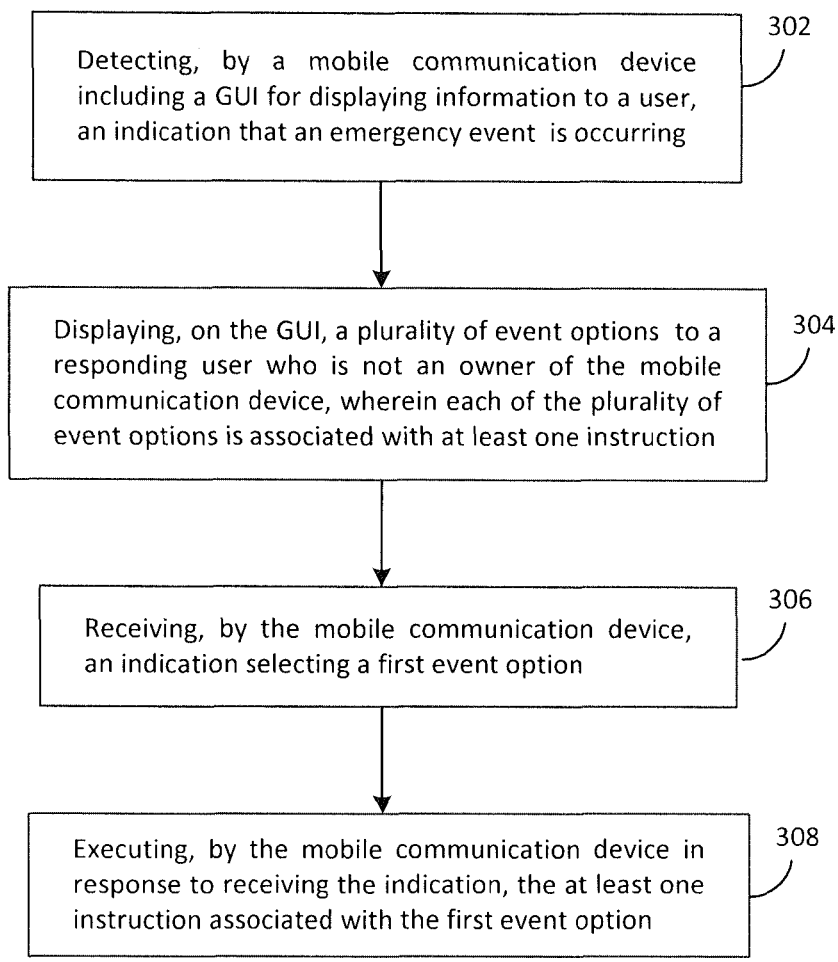
FIG. 3 is an operational flow diagram illustrating a high level overview of an exemplary method for managing an emergency event by a mobile communication device according to an embodiment.

Referring now to FIG. 3, a flow diagram is presented illustrating a method 300 for managing an emergency event according to an embodiment. In an embodiment, the exemplary mobile communication device 200 illustrated in FIG. 2 includes an arrangement of components configured to implement the method 300, which also can be carried out in environments other than that illustrated in FIG. 2. According to an embodiment, the method 300 begins, in block 302, when an indication that an emergency event is occurring is detected by, for example, the emergency detection module 214 in the Emergency Management Application 210. Once the emergency event is detected, the plurality of event options 215 is displayed on the GUI 201a, in block 304, to a responding user 110 who is not an owner of the mobile communication device 200. An indication selecting a first event option 215 is received, in block 306, by, for example, the option selection module 216, which can be configured to invoke the execution module 218 to execute the instruction(s) 217 associated with the first event option in block 308.

According to an embodiment, the detected emergency event can be a medical emergency event relating to the owner of the mobile communication device 200 and the responding user 110 can be a medically trained first responder or an untrained bystander. Alternatively, or in addition, the detected emergency event can be that the mobile communication device has been found by the responding user 110. Each embodiment will be discussed to provide a more detailed description of the inventive system.

Medical Emergency Event Relating to the Owner

In a medical emergency, an emergency medical technician and/or a paramedic is often one of the first people to arrive to offer medical assistance to an injured person or patient. At that moment, the paramedic may have the following needs:

- To access basic medical information about user;
- To access any other medical information relating to drugs or medical devices on the patient's person (such as nitroglycerin tablets, dextrose tablets or insulin for a diabetic, where the patient's epi-pen is located, etc.);
- To access any relevant recent medical information history (such as when a diabetic last checked blood sugar levels, administered insulin, ate food, etc.);
- To access any recent and/or real-time information from medically-related sensors part of or attached to the mobile device;
- To access more complete medical information and/or medical history of the patient;
- To access any subscription attended service for medical emergencies to which the patient may be subscribed.

Access to this important medical information can be difficult when the injured person is conscious and responsive, and impossible when the injured person is unconscious. According to an embodiment, the Emergency Management Application 210 hosted by the mobile communication device 200 can be configured to manage a medical emergency event relating to the owner of the device 200 by providing access to the owner's medical information. Thus, the injured person, if conscious, can give his or her mobile communication device 200 to the responding user 110, or if the injured person is unconscious, the responding user 110 can search for and find the person's mobile communication device 200.

According to an embodiment, a device administrator can provide and store the owner's medical information 232 to and on the mobile communication device 200 during a set-up process managed by the set up module 212. The device administrator can be the device's owner, a parent of the device's owner, or any party who is authorized to access the owner's medical information 232. During this process, the set-up module 212 can request and receive the owner's medical information 232 and emergency contact information 234 for at least one emergency contact who should be contacted in case of a medical emergency. In an embodiment, the emergency contact can be a close friend of the owner, the owner's family member, and/or a medical care provider. The device administrator can be allowed to rank the emergency contacts in an order of which contact should be contacted first and/or most frequently. Moreover, the device administrator can indicate what type of information the contact can receive and/or how the information should be delivered.

In an embodiment, a form questionnaire can be displayed to the device administrator, e.g., the owner, on the GUI 201a that asks for particular types of medical information and contact information. The owner can provide the medical information 232 and the contact information 234 in the form and can submit the form to the set-up module 212 via an input handler 206. When the information is received, the set-up module 212 can store the owner's medical information 232 and emergency contact information 234 in secure storage 230 of the device 200, which can be accessed by at least one of the instruction modules 220 of the Emergency Management Application 210.

In an embodiment, additional emergency contacts can also be identified on-the-fly, i.e., after the set-up process. For example, the Emergency Management Application 210 can allow the owner to identify emergency contacts as people who are travelling with the owner on a trip, or friends in a restaurant or store with the owner. In this case, the contact information of these people can be stored, so that if a medical emergency is detected, the person contacted can be someone in close proximity to the owner.

Figure 4A:
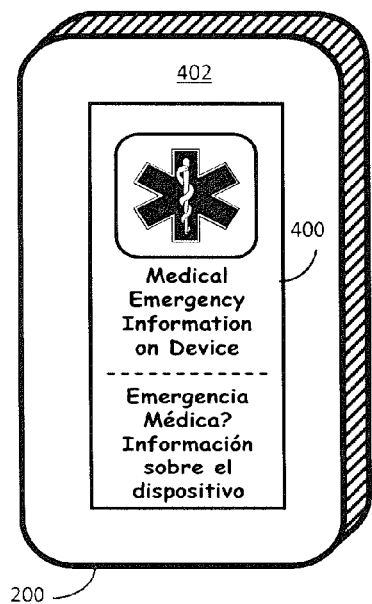
FIG. 4A illustrates an exemplary decal affixed to a surface of an exemplary mobile communication device according to an embodiment.
Figure 4B:
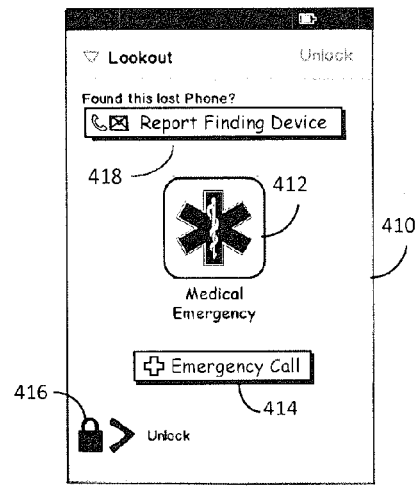
FIG. 4B illustrates an exemplary device lock screen according to exemplary embodiments.

In an embodiment, the mobile communication device 200 can provide an indication that the owner's medical information is accessible by the mobile communication device 200. For example, in FIG. 4A, a decal label 400 affixed onto an encasing surface 402 of the mobile communication device 200 can, in an embodiment, indicate that the owner's medical information is accessible by the mobile communication device 200. Alternatively, or in addition, when the device 200 is turned on, a device lock screen 410 displayed on the GUI 201a can provide the indication, as shown in FIG. 4B. In this embodiment, the device lock screen 410 can include an emergency notification icon 412 that indicates that the owner's medical information is accessible by the mobile communication device 200. In addition, the device lock screen 410 can include an emergency call icon 414.

According to an embodiment, when either or both of the medical emergency 412 and emergency call 414 icons are activated, an indication that a medical emergency event relating to the owner is occurring can be received by the input handler 206 and then provided to the emergency detection module 214. Either of the icons 412, 414 can be activated, in an embodiment, when the responding user 110 presses and/or swipes the icon 412, 414. When the indication is received by the emergency detection module 214, the emergency event is detected.

Alternatively, when the device lock screen does not include the icons 412, 414, the responding user 110 can provide the indication that a medical emergency event relating to the owner is occurring by entering a dedicated unlock code into the device lock screen. When the dedicated unlock code is entered, the medical emergency indication can be received by the input handler 206 and then provided to the emergency detection module 214. According to an embodiment, the dedicated unlock code can be set by the owner, or can be a code known only to medically trained professionals. In an embodiment, the dedicated unlock code is configured to unlock specified modules relating to and including the Emergency Management Application 210 only. Other modules and applications provided by the communication device 200 can remain locked, i.e., disabled.

In an embodiment, when the emergency event is first detected, a connection with an emergency call center 105 can be established, and at least a portion of the owner's medical information 232 can be transmitted to the emergency call center 105. For example, the emergency detection module 214 can instruct the execution module 218 to invoke the connection module 220f to establish the connection with the emergency call center 105, and the transmit information module 220b can be configured to retrieve and transmit the owner's medical information 232 to the emergency call center 105. In an embodiment, when the responding user 110 is a first responder, a communication device associated with the responding user 110 can be coupled to the emergency call center 105 and can also receive the owner's medical information 232.

In another embodiment, a message indicating that a medical emergency is occurring can be broadcasted over an emergency response channel to other first responders. The message can include the location of the mobile communication device 200, and at least a portion of the owner's medical information 232. In addition, the message can include other medical information such as the owner's vital readings, e.g., heart rate, blood pressure, monitored by bio-sensors 207 in the communication device 200. For example, the broadcast information module 220e can be invoked to generate the message, to collect the information, and to transmit the message over the emergency response channel. In an embodiment, the information in the message can be encrypted when it is broadcasted or transmitted from the device 200.

In a further embodiment, a first responder, having received information can choose to open a voice communication with the mobile communication device 200, putting the mobile device audio output to speakers, to attempt to communicate with the device owner or a nearby bystander 110.

Figure 5:
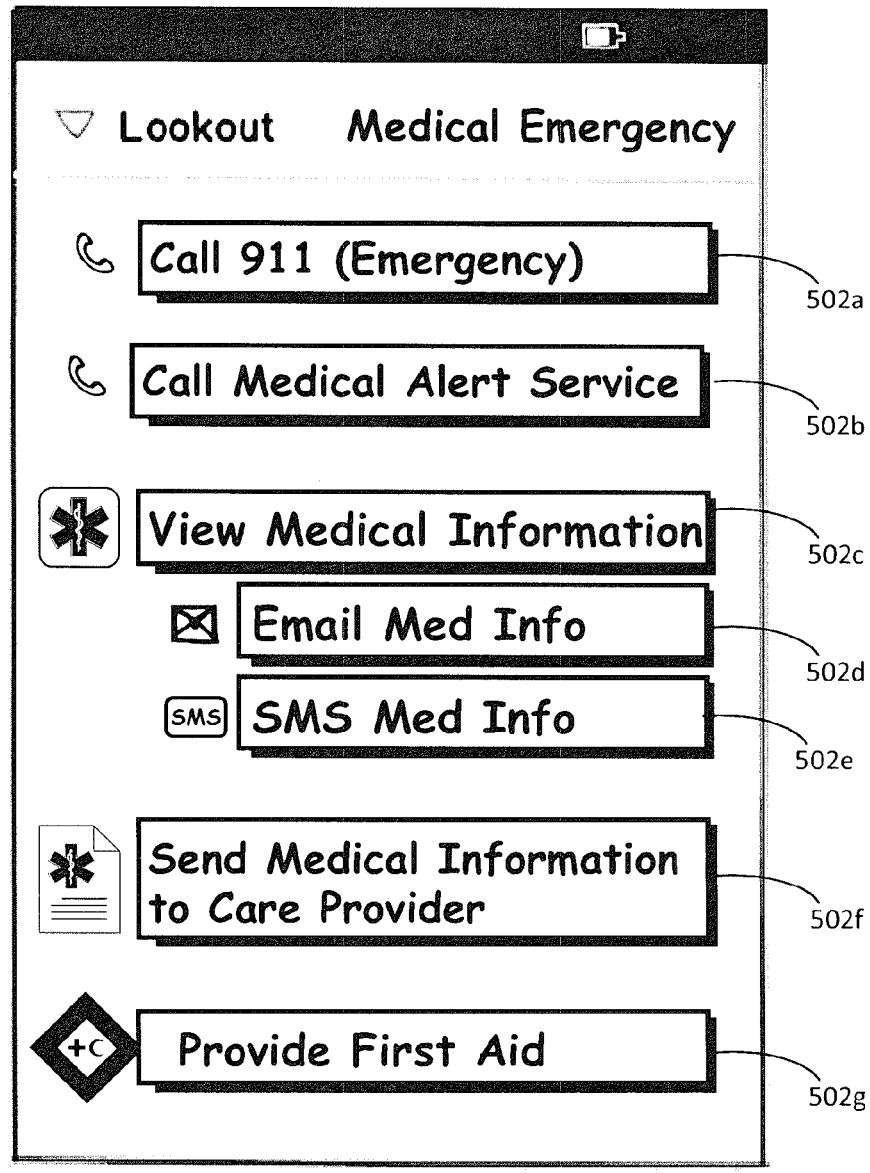
FIG. 5 is an exemplary GUI including medical emergency event options according to an embodiment.

According to an embodiment, when the emergency event is detected, the plurality of event options 215 displayed to the responding user 110 is a plurality of medical emergency event options 215. FIG. 5 illustrates an exemplary GUI for managing a medical emergency event according to an embodiment. As is shown, the plurality of event options 215 displayed to the responding user 110 is a plurality of medical emergency event option icons 502a-502g. When the responding user 110 selects an emergency event option, e.g. by touching an icon, e.g., 502a, representing an event option 215, the input handler 206 can provide an indication selecting the event option 215 to the option selection module 216. In an embodiment, when the indication is received, the option selection module 216 can be configured to retrieve the instructions 217 associated with the selected event option 215, and to provide those instructions 217 to the execution module 218. In an embodiment, when the instructions 217 are received, the execution module 218 can be configured to determine which of the plurality of instruction modules 220 to invoke in order to execute the instructions 217.

For example, when a "Call Emergency" icon 502a is selected, the instructions 217 associated with the corresponding event option 215 can direct the execution module 218 to place a call to an emergency operator, e.g., by entering "911" in the United States. In an embodiment, the execution module 218 can invoke the place call module 220a to initiate an audio transmission to the emergency operator 105 via the audio data transport provider 106, which may be a Voice over Internet Protocol (VoIP) provider or a cellular provider.

In another embodiment, the owner of the mobile communication device 200 can be a subscriber to a medical alert service with operators on call for handling medical emergencies involving the subscriber, and often with specialized knowledge of the subscriber's medical situation. When a "Call Medical Alert Service" icon 502b is selected, the instructions 217 associated with the corresponding event option 215 can direct the execution module 218 to establish a connection with the medical alert service 110a. In this case, the execution module 218 can invoke the connection module 220f to establish the connection.

Figure 6:
FIG. 6 is an exemplary GUI displaying medical information according to an embodiment.

In another embodiment, when a "View Medical Information" icon 502c is selected, the instructions 217 associated with the corresponding event option 215 can direct the execution module 218 to display at least a portion of the owner's medical information 232 on the device's GUI 201a. In this case, the execution module 218 can retrieve the owner's medical information 232 from the secure storage 230 and invoke the display information module 220d to display the information 232 in the GUI 201a. FIG. 6 illustrates an exemplary GUI 600 displaying medical information 232. Prior to displaying the owner's medical information 232, the execution module 218 can be configured to request an authorization code to protect the owner's privacy interests. In an embodiment, the authorization code can be a standard pass code well known to emergency medical personnel, but not known to untrained bystanders.

In an embodiment, in addition to or instead of displaying the owner's medical information 232, the information can be transmitted to another device, e.g., a laptop 102 of a responding paramedic 110a. In this case, when the responding user 110a selects an "Email Med Info" icon 502c1 or a "SMS Med Info" icon 502e, the instructions 217 associated with either corresponding event option 215 can direct the execution module 218 to request a destination address, e.g., an email address or mobile phone number, to which the information 232 should be transmitted. The destination address can be associated with another device of a medical care provider, e.g., the paramedic's laptop 102, and/or another device of a medical care facility, e.g., a nearby hospital's emergency call center 104. According to an embodiment, the execution module 218 can invoke the transmit information module 220b to transmit the medical information 232 to the destination address. In an embodiment, other transmission options can be available besides email and SMS text. For example, the information 232 can be transmitted via a Bluetooth connection or any other suitable information transmission protocol.

According to another embodiment, when a "Send Medical Information to a Care Provider" icon 502f is selected, the instructions 217 associated with the corresponding event option 215 can direct the execution module 218 to locate at least one nearby medical care provider, e.g., a hospital 104, a doctor, or an ambulance service, and to transmit the owner's medical information 232 to that care provider, e.g., 104. In an embodiment, the execution module 218 can invoke the locate module 220h to identify the destination information of the nearby care providers. For example, the locate module 220h can use the geo-locator 205 to determine the immediate location of the device 200, and then search for nearby care providers using a cloud-based directory service (not shown) or the stored care provider directory 236. When nearby care providers are located, the destination information can be displayed to the responding user 110 as suggested destinations. When at least one of the suggested destinations is selected, the execution module 218 can invoke the transmit information module 220b to transmit the medical information 232 to the selected destination address(es) associated with the nearby care providers.

In another embodiment, when a "Provide First Aid" icon 502g is selected, the instructions 217 associated with the corresponding event option 215 can direct the execution module 218 to provide directions to the responding user 110 for providing medical care to the injured owner. In an embodiment, the device 200 can be configured to display the directions in the GUI 201a and/or to play an audio recording of the directions through the device's speaker 202. According to an embodiment, the execution module 218 can retrieve the medical care information 237, which can include a video file, an audio file and/or a document file that provide step-by-step instructions for administering basic first aid and/or CPR. Once retrieved, the execution module 218 can invoke the sound module 220g to play the audio file over the device's speaker 202 and/or invoke the display information module 220d to display the video and/or document file on the device's display 201.

According to an embodiment, the medical care information 237 may require the responding user 110 to use an automated external defibrillator ("AED"). In this situation, the execution module 218 can be configured to determine a location of the nearest AED. For example, the execution module 218 can invoke the locate module 220h to use the geo-locator 205 to determine the immediate location of the device 200, and then search for nearby AEDs using a cloud-based directory service (not shown) and/or the stored care provider directory 236. Alternatively, or in addition, an AED can be configured to broadcast its location information over a dedicated emergency response channel and the locate module 220h can be configured to listen for such a broadcast to locate the nearby AED. When the nearby AED is located, the AED's location information can be displayed or played to the responding user 110. In an embodiment, the location information can include an address, a map, and/or directions to the location.

In an embodiment, when the medical emergency event options 215 are displayed to the responding user 110, the option selection module 216 can be configured to monitor when a medical emergency event option 215 is selected. If a selection is not detected within a predetermined time period, a connection with the emergency call center 105 can automatically be established, and at least a portion of the owner's medical information 232 can be transmitted to the emergency call center 105. Other emergency responses can also be performed. For example, in an embodiment, the device 200 can broadcast an audio announcement over its speaker 202 that a medical emergency is occurring and that medical assistance is needed. Alternatively or in addition, the communication device 200 can automatically broadcast over the emergency response channel that a medical emergency is occurring and the immediate location of the device 200. Other emergency responses, such as those described above relating to event options 215, can also be automatically triggered when a selection is not detected within a predetermined time period.

According to an embodiment, the Emergency Management Application 210 can include an alert module 219 that is configured to listen for medical emergency announcements broadcasted over the emergency response channel, and to provide a notification when such an announcement is detected. Trained medical care providers who install the Emergency Management Application 210 on their personal mobile communication devices 200 can receive the notification and can provide medical assistance. In an embodiment, the notification can be provided only when a medical care provider's device 200 is within a pre-determined distance from the emergency site so that the care provider is alerted only when he or she is nearby. In addition, the Emergency Management Application 210 can be installed in the devices 200 of security guards and/or building managers so that they are notified of medical emergencies within their buildings.

Lost Mobile Communication Device Found by a Responding User

As stated above, a person's mobile communication device can be an essential tool for managing the person's calendar, messages, finances, and professional and social life. When the device is lost, misplaced or stolen, the person's life can be turned inside out. Thus, if the lost device is found by a person other than the owner, several concerns should be addressed. For example, the person finding the device should have some means of reporting the lost device so that the owner can be notified that the device has been found. The person finding the device should also have some means of returning the lost device to the owner. In addition, the person finding the device should not have means of accessing the information stored in the device. According to an embodiment, the Emergency Management Application 210 hosted by a lost mobile communication device 200 can be configured to manage an emergency event involving the reporting and/or returning of the lost mobile communications device 200.

According to an embodiment, during a set-up process managed by the set up module 212, the device administrator can provide and store emergency contact information 234 for people who should be contacted in case the lost phone is found. The device administrator can be the device's owner, a parent of the device's owner, or an employer of the device's owner. During this process, the set-up module 212 can ask the administrator to identify at least one lost device contact and to provide contact information associated with the lost device contact. In an embodiment, the lost device contact can be a close friend of the owner, the owner's family member, the owner's co-worker, a cellular service provider, and/or a company lost-and-found desk. The device administrator can be allowed to rank the lost device contacts in an order of which contact should be contacted first and/or most frequently. Moreover, the device administrator can indicate what type of information the lost device contact can receive and/or how the information should be delivered.

The contact information can include a phone number, an email address, and/or a chat destination identifier (ID). The administrator can provide the contact information 234 in a questionnaire form, which can be submitted to the set-up module 212 via the input handler 206. When the information is received, the set-up module 212 can store the contact information 234 in secure storage 230 of the device 200, which can be accessed by at least one of the instruction modules 220 of the Emergency Management Application 210.

Alternatively, or in addition, the device administrator can set-up the emergency contact information 234 for a plurality of communication devices 200 and then store the contact information 234 in a server 107 accessible by the mobile communication device 200 over the network 120. For example, in a corporate setting, the corporate administrator can set-up the corporate contact information 234 for a plurality of communication devices 200 assigned to employees via the administrator's communication device 200, and store the corporate contact information 234 in a cloud-based service hosted by the server 107. According to an embodiment, one lost device contact can be provided that is a phone-based interactive voice response (IVR) system connected to the cloud-based service. The IVR system can be configured to collect information from the responding user 110, and to establish communications, e.g., email messages, automated outbound phone calls, and/or text messages, with designated contacts, such as the owner, the device administrator, and/or the corporation.

In an embodiment, additional lost device contacts can also be identified on-the-fly, i.e., after the set-up process. For example, the Emergency Management Application 210 can allow the owner to identify lost device contacts as people who are travelling with the owner on a trip, or friends in a restaurant or store with the owner. In this case, the contact information of these people can be stored, so that when the lost device is found, the person contacted can be someone in close proximity to the owner.

In an embodiment, when the device 200 is turned on, the device lock screen 410 displayed on the GUI 201a can include lost device notification icon 418, which when activated, provides an indication that the responding user 110 has found the mobile communication device 200. The icon 418 can be activated, in an embodiment, when the responding user 110 presses and/or swipes the icon 418. When the indication is received by the emergency detection module 214, the emergency event is detected.

In an embodiment, when the emergency event is first detected, the emergency detection module 214 can be configured to disable all functions and services of the mobile communication device 200 except for those needed to execute the instructions 217 associated with each of the plurality of lost device emergency event options 215. For example, the emergency detection module 214 can instruct the execution module 218 to invoke the lock module 220i to place the device 200 into a locked mode thereby disabling the functions and services of the device 200 not needed to support the Emergency Management Application 210.

Alternatively or in addition, in another embodiment, when the emergency event is first detected, a current geo-location of the mobile communication device 200 can be determined based on information collected by the geo-locator 205 and transmitted to a designated lost device contact. For example, in an embodiment, the emergency detection module 214 can instruct the execution module 218 to invoke the security module 220c to determine the device's geo-location information and to invoke the transmit information module 220b to transmit the information to the lost device contact. In addition, the emergency detection module 214 can instruct the execution module 218 to invoke the security module 220c to capture an image of the responding user 110 using the device's camera 204. In an embodiment, the image can be transmitted as well to the lost device contact.

Figure 7:
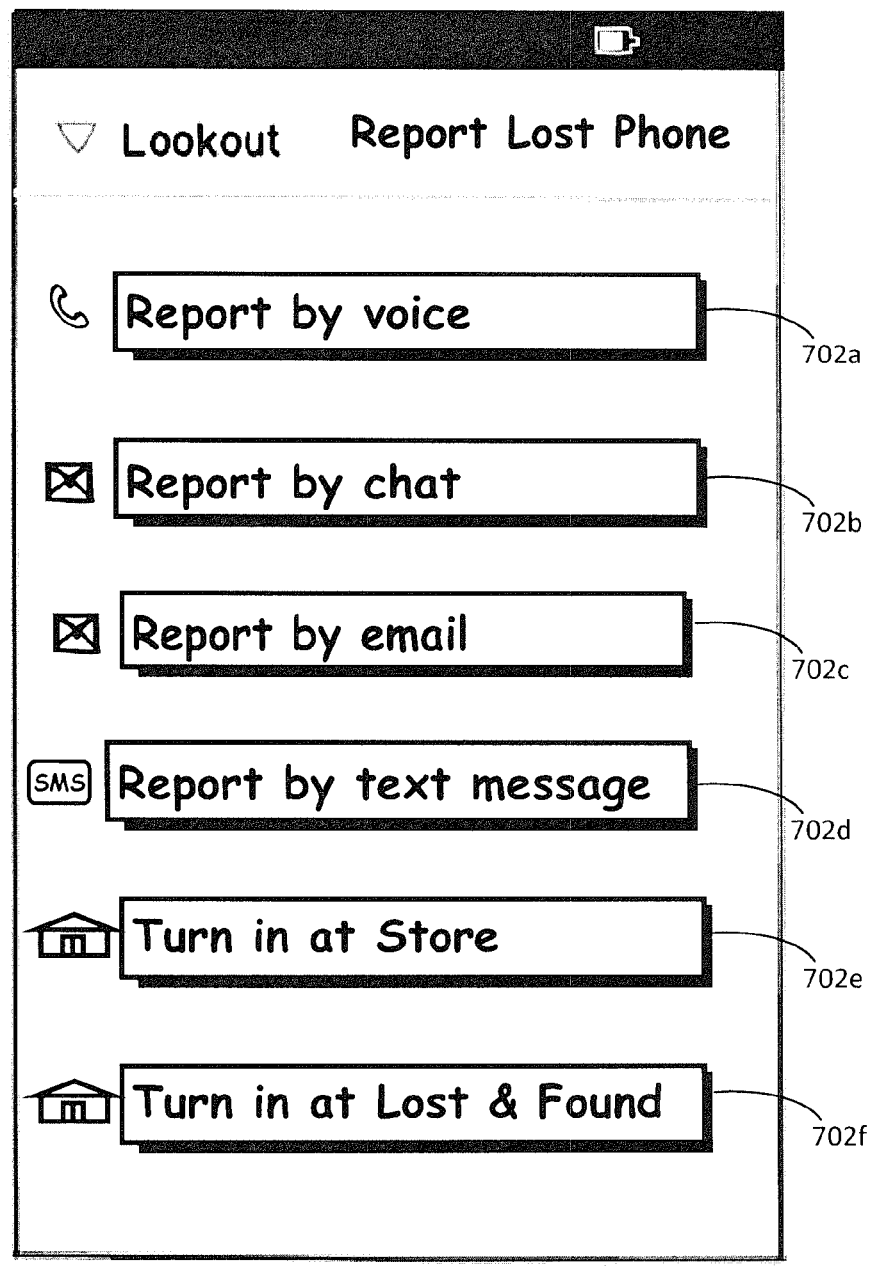
FIG. 7 is an exemplary GUI including lost device emergency event options according to an embodiment.

According to an embodiment, when the emergency event is detected, the plurality of event options 215 displayed to the responding user 110 is a plurality of lost device emergency event options 215. FIG. 7 illustrates an exemplary GUI for managing an emergency event involving a lost communication device according to an embodiment. As is shown, the plurality of event options 215 displayed to the responding user 110 is a plurality of lost device event option icons 702a-702f. When the responding user 110 selects an event option, e.g. by touching an icon representing an event option 215, the input handler 206 can provide an indication selecting the event option 215 to the option selection module 216. In an embodiment, when the indication is received, the option selection module 216 can be configured to retrieve the instructions 217 associated with the selected event option 215, and to provide those instructions 217 to the execution module 218. In an embodiment, when the instructions 217 are received, the execution module 218 can be configured to determine which of the plurality of instruction modules 220 to invoke in order to execute the instructions 217.

In an embodiment, the plurality of lost device event options 702a-702f can present several ways in which the responding user 110 can either report that the lost device has been found or can return the lost device to its owner. For example, when a "Report by Voice" icon 702a is selected, the instructions 217 associated with the corresponding event option 215 can direct the execution module 218 to establish a phone connection with at least one of the lost device contacts, e.g., 110c, provided in the contact information 234.

In an embodiment, the execution module 218 can retrieve a phone number from the contact information 234 of the lost device contact 110c and can invoke the place call module 220a, which is configured to provide the phone number to the audio data transport provider 106 to initiate an audio transmission to a communication device 103a of the contact 110c. In an embodiment, the place call module 220a can establish the phone connection without displaying the phone number on the GUI 201a, thereby preserving the confidentiality and identity of the contact 110c and his/or contact information 234. Moreover, the place call module 220a can indicate to the lost device contact 110c that the phone call is from the communication device 200, which was lost and has been found. For example, the place call module 220a can set the callerID value to be "Reporting Lost Phone" so that when the lost device contact 110c receives the call, the contact 110c is informed that the call is coming from a lost device 200 that has been found.

In another embodiment, when a "Report by Chat" icon 702b is selected, the instructions 217 associated with the corresponding event option 215 can direct the execution module 218 to establish a connection with a chat service for real-time text-based communications between the responding user 110 using the lost mobile communication device 200 and the lost device contact 110c. In an embodiment, the contact information 234 can include information identifying the chat service and a destination identifier associated with the contact 110c. The execution module 218 can retrieve this information from the contact information 234 of the lost device contact 110c and can invoke the connection module 220f, which can be configured to establish the connection with the chat service. As always, the connection module 220f can be configured to execute this task without displaying on the GUI 201a the contact's contact information 234.

In an embodiment, when a "Report by Email" icon 702c or a "Report by text message" icon 702d is selected, the instructions 217 associated with the corresponding event option 215 can direct the execution module 218 to generate an email message or a text message indicating that the mobile communication device has been found. According to an embodiment, the instructions 217 can also direct the execution module 218 to collect contact information of the responding user 110. For example, the responding user 110 can be requested to provide his or her name, email address, and/or phone number. The responding user's contact information can then be included in the email or text message. Moreover, other useful information can be included in the email or text message. For example, in an embodiment, the instructions 217 can also direct the execution module 218 to collect the device's immediate location information, to capture an image of the responding user 110, and/or to collect the device's state information. This additional information can then be included in the email or text message transmitted to the lost device contact 110c.

Once the email or text message is generated, the execution module 218 can be directed to transmit the email or text message to the lost device contact 110c without revealing the contact information 234 to the responding user 110. In an embodiment, the email message can be transmitted to the contact's email address, and the text message can be transmitted to the contact's email address and/or the contact's mobile phone number.

In an embodiment, when any of the reporting icons 702a-702d is selected, the instructions associated with each of the corresponding event option 215 can also include instructions for directing the execution module 218 to generate an email or a text message indicating that the mobile communication device has been found, and to transmit the message to the lost device contact 110c. Additionally, the email can be transmitted to a cloud-based service 107 for auditing, tracking and/or recovery purposes.

According to an embodiment, the responding user 110 can elect to return the lost device 200 to its owner with or without reporting that the device 200 has been found. For example, a cellular phone service provider or a device manufacturer can provide a cloud-based device return service for receiving the lost mobile communication device 200 and returning it to the owner. In an embodiment, the device return service can be associated with a drop-off location not related to the owner, e.g., in a retail store or in an office, where the device 200 can be deposited. According to an embodiment, when a "Turn in at Store" icon 702e is selected, the instructions 217 associated with the corresponding event option 215 can direct the execution module 218 to identify the device return service, and to instruct the responding user 110 to deposit the mobile communication device with the identified device return service.

For example, in an embodiment, the execution module 218 can invoke the locate module 220h to identify the drop-off location associated with the device return service, and can invoke the display information module 220d and/or the sound module 220g to display on the GUI 201a and/or broadcast over the speaker 202 drop-off instructions for depositing the lost device 200 at the drop-off location. In an embodiment, the drop-off instructions can instruct the responding user 110 to mail the lost device 200 to a specified address. Alternatively, or in addition, the drop-off instructions can guide the responding user 110 to the drop-off location. In this case, a map and/or directions to the drop-off location can also be displayed on the GUI 201a.

Alternatively, or in addition, a mall, building or similar large public space, can provide a lost-and-found service and a drop-off location where lost items, e.g., the lost communication device 200, can be deposited, and recovered. In an embodiment, the service be a network-discoverable resource that broadcasts its existence using a communication protocol, such as a Service Advertising Protocol (SAP) included in an Internetwork Packet Exchange (IPX) protocol, or a Mobility Services Advertisement Protocol (MSAP), which supports messages via IEEE 802.11u GAS without requiring authentication to a Wi-Fi network.

In an embodiment, when a "Turn in at Lost & Found" 702f icon is selected, the instructions 217 associated with the corresponding event option 215 can direct the execution module 218 to scan for messages from the lost-and-found service. When such a service is discovered, the execution module 218 can then instruct the responding user 110 to turn in the mobile communication device 200 at the drop-off location. In addition, the execution module 218 can generate a message indicating that the mobile communication device 200 has been found and, if the device 200 has been turned in, the drop-off location where the device 200 can be recovered. The message can then be transmitted to the lost device contacts.

In an embodiment, when either the "Turn in at Store" 702e or "Turn in at Lost & Found" 702f icon are selected, the instructions 217 associated with each of the corresponding event options 215 can also include instructions for directing the execution module 218 to establish a connection with the device return service or the lost-and-found service (collectively, "the service"), and to transmit information identifying the mobile communication device 200 and/or authentication information 238 of the owner to the service. In an embodiment, the information identifying the device 200 can be the device's make, model number, color and/or any other information identifying the device 200. The authentication information 238 can be a username/password, an answer to a security question, an image of the owner, and/or any other security token to ensure that the person recovering the lost device 200 at a drop-off location is actually the owner.

In an embodiment, when the lost device has been turned-in at a drop-off location and when a person attempts to recover the lost phone at the drop-off location, the person can provide identifying information that matches what was sent to the service. Alternatively, when the person appears at the drop-off location, a webpage for the service can be uploaded on a computer terminal, and the person can be prompted to enter information identifying the lost device 200 and to provide authenticating information so that the service can determine that the person is indeed the lost device's owner. For example, the person can provide certain personal identifying information, a password, and/or correct answers to predefined security questions.

Alternatively, or in addition, the person can be asked to answer dynamically derived questions based on the owner's behavior using the device 200. For example, questions that require the person to choose an answer from multiple choices can be presented. In embodiment, a plurality of images can be displayed and the question can be, "Which of these pictures did you take?" The images can include pictures containing people, a selection of other pictures identified from a large catalog of pictures as similar, or other pictures taken at the same location as determined by picture metadata which contain recognizable people within them, taken during a similar season, as well as a set of other pictures each of which is similar to each other but not similar to any pictures which the user has taken. Alternatively, a plurality of the popular games in the same category of a game played by the owner can be displayed, and question can be, "Which game do you play frequently?" When the identifying information matches that provided by the person, and/or the questions are answered correctly, the service can verify that the person is indeed the rightful owner, and the lost device 200 can be returned.

According to another embodiment, when the device 200 is not yet turned-in at a drop-off location, the Emergency Management Application 210 can transmit periodic messages indicating the device's location to the cloud-based service and/or to the lost device contacts. Alternatively, a "Report Lost Device" service can be provided that advertises its service over the network 120. When the device 200 scans for and discovers a Report Lost Device service, the device 200 can transmit to the service an identifier identifying a name or URL of a lost device registry, so that the service can report the time and location at which the lost device 200 was encountered to the lost device registry. Alternatively, other communication devices can host the "Report Lost Device" service, and can receive incoming time and location information from a lost device 200, and can report that information "up the line" to the designated lost device registry.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for managing an emergency event by a mobile communication device, the method comprising:
   detecting, by the mobile communication device including a graphical user interface (GUI) for displaying information to a responding user, an indication that the emergency event relating to an owner of the mobile communication device is occurring, the mobile communication device being configured to provide access to medical information of the owner of the mobile communication device;
   displaying, on the GUI, a plurality of event options to the responding user who is not the owner of the mobile communication device in response to the indication of the emergency event, wherein each of the plurality of event options is associated with at least one instruction relating to at least one of an emergency action and emergency response;
   monitoring, for a predetermined time period, for a selection of a first event option of the plurality of event options displayed on the GUI;
   when the selection is not detected within the predetermined time period, establishing, by the mobile communication device, a connection with an emergency call center, and transmitting at least a portion of the owner's medical information to the emergency call center; and
   when the selection is detected within the predetermined time period, executing, by the mobile communication device, the at least one instruction associated with the first event option.

2. The method of claim 1 wherein the at least one instruction associated with the first event option includes providing, by the mobile communication device, access to at least the portion of the owner's medical information.

3. The method of claim 1 further comprising displaying on the GUI, a device lock screen that includes an emergency notification icon, which when activated, provides the indication that the emergency event relating to the owner is occurring.

4. The method of claim 1 wherein transmitting at least the portion of the owner's medical information to the emergency call center includes
   broadcasting, over an emergency response channel, that the emergency event is occurring and a location of the mobile communication device, and broadcasting at least the portion of the owner's medical information over the emergency response channel.

5. The method of claim 1 wherein the mobile communication device includes an audio speaker component and wherein the method further includes:
   providing an audio broadcast via the audio speaker component, the audio broadcast comprising an announcement of the emergency event and an appeal for assistance; and
   broadcasting, by the mobile communication device, over an emergency response channel that the emergency event is occurring and a location of the mobile communication device.

6. The method of claim 1 wherein the emergency event is that the mobile communication device has been found by the responding user.

7. The method of claim 6 further comprising displaying on the GUI, a device lock screen that includes a lost device notification icon, which when activated, provides an indication that the responding user has found the mobile communication device.

8. The method of claim 6 wherein the mobile communication device includes a geo-location tracking system and a camera, and wherein in response to detecting that the mobile communication device is found, the method further comprises:
   automatically disabling, by the mobile communication device, all functions and services of the mobile communication device except for those needed to execute the at least one instruction associated with each of the plurality emergency event options;
   determining a current geo-location of the mobile communication device based on information collected by the geo-location tracking system;
   capturing an image of the responding user; and
   transmitting the current determined geo-location and the image to a designated lost device contact.

9. A method for managing an emergency event involving a medical emergency, the method comprising:
   detecting, by a mobile communication device configured to provide access to medical information of an owner of the mobile communication device and including a graphical user interface ("GUI") for displaying information to a responding user, the medical emergency event relating to the owner;
   displaying, on the GUI, a plurality of medical emergency event options to the responding user who is not the owner of the mobile communication device in response to detecting the medical emergency event, wherein each of the plurality of medical emergency event options is associated with at least one instruction relating to at least one of an emergency action and emergency response;
   monitoring, for a predetermined time period, for a selection of a first medical emergency event option of the plurality of medical emergency event options on the GUI;
   when the selection is not detected within the predetermined time period, establishing, by the mobile communication device, a connection with an emergency call center, and transmitting at least a portion of the owner's medical information to the emergency call center; and when the selection is detected within the predetermined time period, executing, by the mobile communication device, the at least one instruction associated with the first medical emergency event option.

10. The method of claim 9 further comprising providing, by the mobile communication device, an indication that the mobile communication device owner's medical information is accessible by the mobile communication device.

11. The method of claim 10 wherein the indication that the mobile communication device owner's medical information is accessible by the mobile communication device is provided by a decal label affixed onto an encasing surface of the mobile communication device.

12. The method of claim 10 wherein the indication that the mobile communication device owner's medical information is accessible by the mobile communication device is provided by a device lock screen displayed on the GUI.

13. The method of claim 9 wherein a device lock screen displayed on the GUI includes an emergency notification icon, which when activated, provides the indication that the medical emergency event is occurring.

14. The method of claim 13 wherein detecting the medical emergency event relating to the owner includes receiving an indication that the emergency notification icon is at least one of pressed and swiped by the responding user who is not the owner of the mobile communication device.

15. The method of claim 13 wherein the device lock screen includes an emergency call icon, and wherein detecting the medical emergency event relating to the owner includes receiving an indication that the emergency call icon is at least one of pressed and swiped by the responding user who is not the owner of the mobile communication device.

16. The method of claim 9 wherein transmitting at least the portion of the owner's medical information to the emergency call center includes broadcasting, by the mobile communication device over an emergency response channel, that the medical emergency event is occurring and a location of the mobile communication device, and broadcasting the portion of the owner's medical information over the emergency response channel.

17. The method of claim 9 wherein when the owner of the mobile communication device is a subscriber to a medical alert service, the at least one instruction associated with the first medical emergency event option includes establishing, by the mobile communication device, a connection with the medical alert service.

18. The method of claim 9 wherein the at least one instruction associated with the first medical emergency event option includes displaying, on the GUI, at least the portion of the mobile communication device owner's medical information.

19. The method of claim 9 wherein the at least one instruction associated with the first medical emergency event option includes requesting a destination to which the mobile communication device owner's medical information is to be transmitted, receiving the destination, and transmitting at least the portion of the mobile communication device owner's medical information to the destination.

20. The method of claim 19 wherein the destination is at least one of an email address and a mobile phone number associated with another device of at least one of a medical care facility and a medical care provider.

21. The method of claim 9 wherein the at least one instruction associated with the first medical emergency event option includes providing at least one of an audio direction and a text direction to the responding user for providing medical care to the owner.

22. The method of claim 21 wherein the at least one instruction associated with the first medical emergency event option further includes determining a location of an automated external defibrillator ("AED") and providing the location to the responding user.

23. The method of claim 9 wherein the mobile communication device includes an audio speaker component and wherein the method further includes providing an audio broadcast via the audio speaker component, the audio broadcast comprising an announcement of the medical emergency event and an appeal for assistance.

24. The method of claim 9 further including broadcasting, by the mobile communication device, over an emergency response channel that the medical emergency event is occurring and a location of the mobile communication device.

25. A method for managing an emergency event involving a lost mobile communication device, the method comprising:

receiving, from a device administrator of the mobile communication device, contact information of a lost device contact, and storing the contact information in a storage component in the mobile communication device, the lost device contact is at least one of a service provider, a contact associated with a frequently called phone number, a contact identified as an emergency contact, and a phone-based interactive voice response (IVR) system;

detecting, by the mobile communication device including a graphical user interface ("GUI") for displaying information, that the mobile communication device is found by a responding user who is not an owner of the mobile communication device;

displaying, on the GUI, a plurality of lost device emergency event options to the responding user in response to the detection of the found mobile communication device, wherein each of the plurality of lost device emergency event options is associated with at least one instruction relating to at least one of an emergency action and emergency response and at least one of the plurality of lost device emergency event options is associated with the lost device contact;

receiving, by the mobile communication device, an indication selecting a first lost device emergency event option of the plurality of event options on the GUI; and in response to receiving the indication, executing, by the mobile communication device, the at least one instruction associated with the first lost device emergency event option.

26. The method of claim 25 wherein a device lock screen displayed on the GUI includes a lost device notification icon, which when activated, provides an indication that the responding user has found the mobile communication device.

27. The method of claim 26 wherein detecting that the mobile communication device is found includes receiving the indication that the lost device notification icon is at least one of pressed and swiped by the responding user.

28. The method of claim 25 wherein when the contact information includes a phone number of the lost device contact, the at least one instruction associated with the first event option includes establishing, by the mobile communication device, a phone connection with the lost device contact.

29. The method of claim 28 wherein establishing the phone connection includes providing the phone number of the lost device contact to a phone service without displaying the phone number on the GUI so that the contact information of the lost device contact remains confidential.

30. The method of claim 29 wherein the phone service is at least one of a mobile phone service provider and a VoIP service provider.

31. The method of claim 25 wherein when the contact information includes a phone number of the lost device contact, the at least one instruction associated with the first event option includes generating a text message indicating that the mobile communication device has been found and transmitting, by the mobile communication device, the text message to the lost device contact without revealing the contact information to the responding user.

32. The method of claim 25 wherein when the contact information includes information identifying a chat service and the lost device contact, the at least one instruction associated with the first event option includes establishing, by the mobile communication device, a connection with the chat service for real-time text-based communication between the responding user using the mobile communication device and the lost device contact without revealing the contact information to the responding user.

33. The method of claim 25 wherein when the contact information includes an email address of the lost device contact, the at least one instruction associated with the first event option includes generating a message indicating that the mobile communication device has been found, and transmitting the message to the email address of the lost device contact without revealing the contact information to the responding user.

34. The method of claim 33 wherein the at least one instruction for generating the message includes receiving contact information associated with the responding user and including the responding user's contact information in the message.

35. The method of claim 25 wherein the mobile communication device includes a geo-location tracking system, and wherein the at least one instruction associated with the first event option includes:
determining a current geo-location of the mobile communication device based on information collected by the geo-location tracking system; and
transmitting the determined geo-location to the lost device contact.

36. The method of claim 25 wherein the mobile communication device includes a camera, and wherein the at least one instruction associated with the first event option includes capturing an image of the responding user and transmitting the image to the lost device contact.

37. The method of claim 25 wherein the at least one instruction associated with the first event option includes:
identifying a device return service for receiving the mobile communication device and returning the mobile communication device to the owner; and
directing the responding user to deposit the mobile communication device with the identified device return service.

38. The method of claim 37 wherein the at least one instruction associated with the first event option further includes:
establishing a connection with the identified device return service; and
transmitting information identifying the mobile communication device and authentication information of the owner to the device return service.

39. The method of claim 25 wherein in response to detecting that the mobile communication device is found, the method further comprises automatically disabling, by the mobile communication device, all functions and services of the mobile communication device except for those needed to execute the at least one instruction associated with each of the plurality of lost device emergency event options.

40. The method of claim 25 wherein the mobile communication device includes a geo-location tracking system and wherein in response to detecting that the mobile communication device is found, the method further comprises determining a current geo-location of the mobile communication device based on information collected by the geo-location tracking system and transmitting the determined geo-location to the lost device contact.

41. The method of claim 25 wherein the mobile communication device includes a camera, and wherein in response to detecting that the mobile communication device is found, the method further comprises capturing an image of the responding user and transmitting the image to the lost device contact.

* * * * *